United States Patent [19]
Kikuchi et al.

[11] Patent Number: 5,898,664
[45] Date of Patent: *Apr. 27, 1999

[54] POSITION CONTROLLING MECHANISM FOR A DISC CARTRIDGE

[75] Inventors: Shuichi Kikuchi, Miyagi; Norio Sugawara, Tochigi, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,178

[22] Filed: Mar. 7, 1997

[30] Foreign Application Priority Data

Mar. 19, 1996 [JP] Japan ................................. 8-063484
Aug. 13, 1996 [JP] Japan ................................. 8-213387

[51] Int. Cl.⁶ .............................. G11B 3/70; G11B 23/03
[52] U.S. Cl. ........................................ 369/291; 360/133
[58] Field of Search ............................ 369/291, 275.5, 369/270, 263, 191, 192, 77.2, 75.2; 360/133, 132, 99.06

[56] References Cited

U.S. PATENT DOCUMENTS

| | | | |
|---|---|---|---|
| 4,799,123 | 1/1989 | Kanazawa et al. | 360/133 |
| 5,084,861 | 1/1992 | Takahashi | 369/291 |
| 5,121,278 | 6/1992 | Tanaka et al. | 360/133 |

*Primary Examiner*—Stuart S. Levy
*Assistant Examiner*—Kenneth W. Fields
*Attorney, Agent, or Firm*—Frommer Lawrence & Haug, LLP.; William S. Frommer

[57] ABSTRACT

A disc cartridge of high reliability for protecting an optical disc from a shock generated such as during transport. On the facing inner surfaces of an upper cartridge half 5 and a lower cartridge half 6 is formed an arcuate disc housing wall section 8 in association with the outer periphery of an optical disc 2 for constituting a disc housing section 9. The disc housing wall section 8 is interrupted at four positions 28 on each of which a boss 28 is set upright. A stationary guide having a substantially columnar guide portion and a flange protruded outwardly from upper and lower sides of the guide portion is fitted on the boss to complete a disc guide member. Four such disc guide members 20a, 20b, 20c and 20d are provided for supporting the disc cartridge 1.

8 Claims, 18 Drawing Sheets

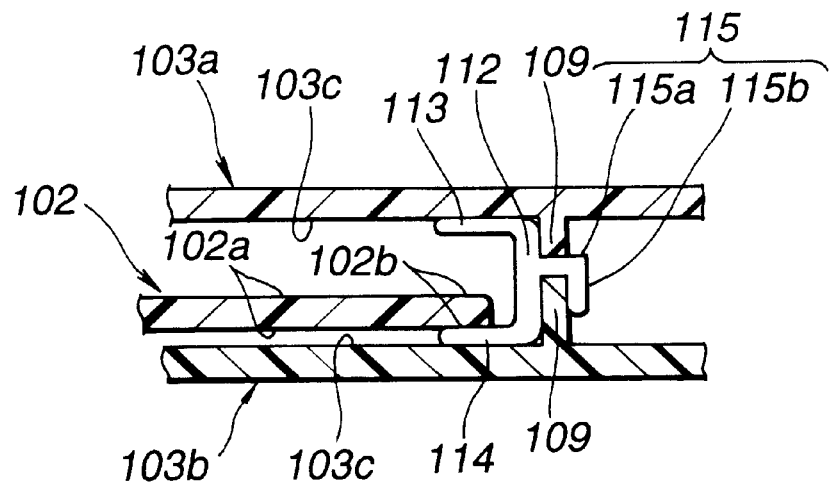
FIG.22A
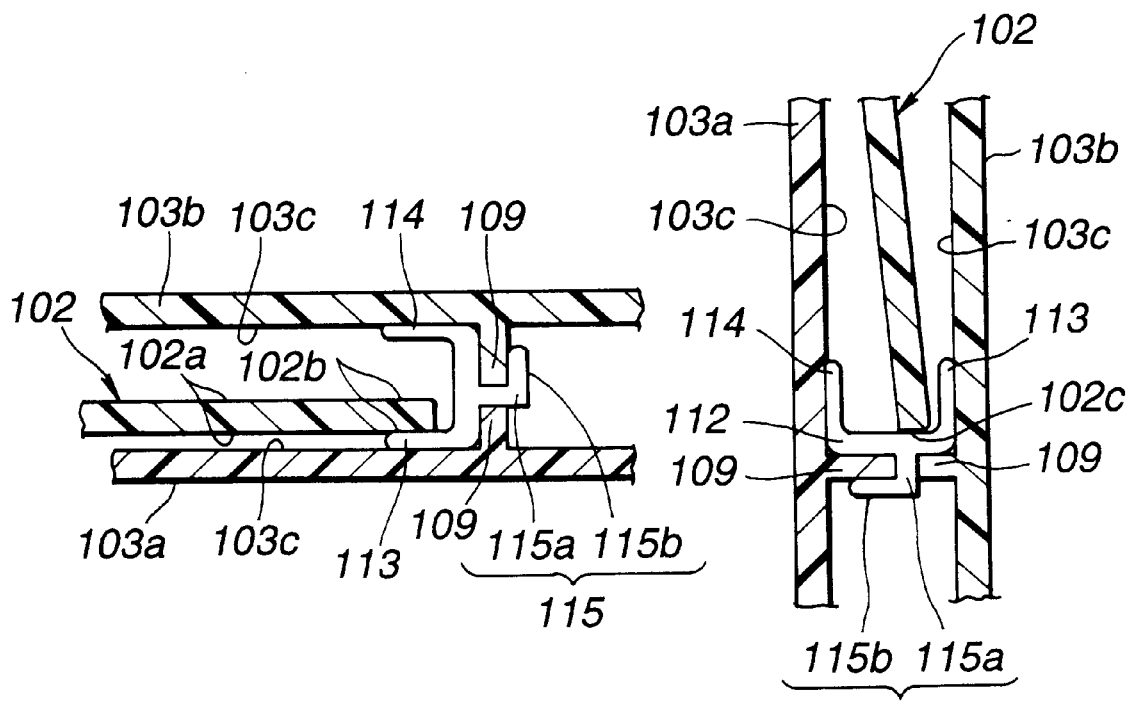
FIG.22B
FIG.22C

POSITION CONTROLLING MECHANISM FOR A DISC CARTRIDGE

BACKGROUND OF THE INVENTION

1. Field of the Invention

This invention relates to a disc cartridge rotatably housing therein a disc-shaped recording medium for recording information signals.

2. Description of the Related Art

Such a disc cartridge has been proposed which has a large-sized disc with a diameter of 30 cm housed therein for achieving a higher recording capacity for the recording information signals. This disc cartridge is used under hostile using conditions in which it is automatically loaded on a recording/reproducing apparatus using an automatic loading device from a housing section housing plural disc cartridges. To this end, the disc cartridge has mounted therein a disc supporting member constituted by a resilient material for being thereby protected against shock during loading or transport.

Referring to FIG. 1, a conventional disc cartridge 201 is made up of a main cartridge body portion 203, for rotatably housing an optical disc 202, and a shutter member 204 slidably mounted on this main cartridge body portion 203.

The main cartridge body portion 203 is made up of an upper cartridge half 205 and a lower cartridge half 206 abutted to each other and coupled to each other by plural set screws 207. The upper and lower cartridge halves 205, 206 are each substantially in the shape of a saucer of shallow depth so that the main cartridge body portion 203 is in the shape of a planar box. The facing inner sides of the upper and lower cartridge halves 205, 206 delimit an arcuately-shaped disc housing wall section 208 in meeting with the outer rim of the optical disc 202 for constituting a disc housing section 209.

In view of possible thermal expansion and dimensional accuracy of the optical disc 202 and the upper and lower cartridge halves 205, 206, the disc housing section 209 is formed to be larger than the outer diameter of the optical disc 202 for preventing the risk that the disc housing section be smaller than the disc diameter or preventing the optical disc 202 from being contacted with the disc housing wall section 208 during disc rotation.

At a mid portion of the main cartridge body portion 203 is formed a disc table entrance aperture 210 which is in effect an upper circular aperture and a lower circular aperture. In proximity to this disc table entrance aperture 210 is formed a recording/reproducing aperture 211 which is in effect an upper rectangular aperture and a lower rectangular aperture. On the disc table entrance aperture 210 is slidably mounted a shutter member 204 for sliding along the front side of the main cartridge body portion 203 for closing the recording/reproducing aperture 211.

The shutter member 204 is formed by warping a metallic plate, such as a thin stainless steel sheet, into a U-shape in cross-section, and is of a length sufficient to close the recording/reproducing aperture 211. The shutter member 204 is provided with a shutter guide member 213 fixedly mounted thereon. The shutter member 204 is secured to the shutter guide member 213 by set screws 214, while the shutter guide member 213 is engaged in a guide groove 212 formed along the front side edge of the main cartridge body portion 203.

On the shutter member 204 is rotatably mounted an arm 215a via a pinion gear 215b meshing with a rack gear 215c. The arm 215a has its other end mounted on a gear 216 rotatably mounted at a corner of the main cartridge body portion 203. The gear 216 is engaged with an engagement portion 217 provided on a lateral side edge adjacent to the lateral side edge of the main cartridge body portion 203 provided with the guide groove 212.

In the non-use state, the above-described shutter mechanism locks the recording/reproducing aperture 211 in the close state, with the the shutter guide member 213 being then urged by a spring 218 in the direction shown by arrow A.

When the disc cartridge 201 is loaded on the recording/reproducing apparatus, the shutter guide member 213 is moved in a direction indicated by arrow B by an opening member configured for opening the shutter guide member 213 provided on the recording/reproducing apparatus. Thus, the shutter guide member 213 is moved in a direction indicated by arrow B against the force of the spring 218, at the same time as the engagement portion 217 is slid via arm 215a and gear 216 in a direction indicated by arrow C for unlocking the shutter mechanism for opening the recording/reproducing aperture 217.

The optical disc 202, rotatably housed within the above-described main cartridge body portion 203, is made up of an inner rim side non-recording area 202b, formed with a center aperture 202a, an information signal recording area 202c formed radially outwardly of the non-recording area 202b and an outer rim side non-recording area 202d formed radially outwardly of the information signal recording area 202c.

The above-described optical disc 202 is fitted with a hub 219 having a center aperture in which is engaged a center spindle provided on the recording/reproducing apparatus for closing the center aperture 202a. This hub 219 is made up of a ring member formed of a synthetic resin material and a magnetically attracting metal plate mounted on both ends on one surface of the ring member. The hub 219 is exposed to outside by the disc table entrance aperture 210 of the disc cartridge 201.

When loaded on the recording/reproducing apparatus, the disc cartridge 201 is loaded in position on the disc table, with the center spindle engaging in the center aperture of the hub 219 and with the optical disc 202 being magnetically chucked by a magnet for being enabled to rotate in unison with the disc table.

On the facing inner sides of the upper and lower cartridge halves 205, 206 towards the inner rim of the disc housing wall section 208 and on the outer rim of the disc table entrance aperture 210, there are arranged plural disc supporting members 220 configured for softening the shock applied to the optical disc 202 loaded on the recording/reproducing apparatus.

The disc supporting member 220a is made up of a circular shock absorbing member 221a, formed of an elastic material, and a mounting plate 222a formed by a metal plate of high toughness and which is used for mounting the shock absorbing member 221a to the upper and lower cartridge halves 205, 206, as shown in FIG. 2. The shock absorbing member 221a is insert-molded at a mid portion of the mounting plate 222a.

On the other hand, since the disc supporting member 220b is provided between the disc table entrance aperture 210 and the recording/reproducing aperture 211, a band-shaped shock absorbing member 221b is insert-molded at a mid portion of the mounting piece 222b.

The disc supporting member 220, thus constructed, is mounted at a pre-set position on facing surfaces of the upper and lower cartridge halves 205, 206 by inserting and caulking a caulking pin, not shown, in a mounting hole 223 formed at each end of the mounting piece 222.

The disc cartridge 201, constructed as described above, houses the optical disc 202 of a larger diameter 30 cm and large mass. Therefore, the risk is high that, during transport or movement of the disc cartridge 201, the optical disc 202 be contacted with the disc housing wall section 208 to cause wear to the wall section 208, with the powder debris produced by wear being apt to be deposited on the upper disc surface to damage the optical disc 202.

In particular, the present disc cartridge 201 is automatically loaded to the recording/reproducing apparatus mechanically by the automatic loading device from the disc housing unit housing plural disc cartridges for recording and/or reproducing the optical disc 202. Since the disc cartridge 201 is transported or loaded/unloaded to the continuous recording and/or reproducing apparatus at an extremely high speed, the optical disc 202 housed within the disc cartridge 201 is vibrated severely and brought into abrupt contact with the disc housing wall section 208 to cause wear to the wall section 208. In such case, the powder debris produced by wear tends to be deposited in large quantities on the upper disc surface to obstruct recording and/or reproduction of information signals.

In addition, the optical disc 202 tends have a higher weight due to increased recording capacity. Thus the force of impact produced on collision of the disc surface with the disc housing wall section 208 is increased for further accelerating the wear.

Moreover, with the optical disc 202, the disc supporting member 220 is mounted for protecting the optical disc 202 from the shock produced on loading. The shock absorbing member 221 of an elastic material, used as the disc supporting member 220, is costly and cumbersome to attach to the optical disc such that it has not been possible to improve the production efficiency of the disc cartridge 201.

SUMMARY OF THE INVENTION

It is therefore an object of the present invention to provide a disc cartridge of high reliability capable of protecting the optical disc from shock produced such as during transport.

According to the present invention, there is provided a disc cartridge including a disc-shaped recording medium having a signal recording area for recording information signals, an inner rim holding portion formed radially inwardly of the signal recording area and having a center aperture formed therein, and a non-recording area where no information signals are recorded. The non-recording area is formed radially outwardly of the signal recording area.

The disc cartridge also includes a main cartridge body portion having a disc housing wall section set upright on facing major surfaces for defining a disc housing section for rotatably accommodating the disc-shaped recording medium therein, and a position controlling mechanism provided in the disc housing section for extending along the disc housing wall section for controlling the housing position of the disc-shaped recording medium accommodated therein.

With the above disc cartridge, in which the disc position is controlled by the position controlling mechanism, there is no risk of the optical disc in the inside of the disc cartridge from being oscillated and brought not contact with the disc housing wall section for causing wear thereto or the powder debris caused by wear becoming affixed on the disc surface to obstruct recording/reproduction of information signals.

Preferably, a position control mechanism is provided on a mounting portion constituted by an upstanding wall section formed in continuation to the disc housing wall section.

Preferably, a circular rib is formed in each of an upper cartridge half and a lower cartridge half making up a main cartridge body portion, and the circular ribs and the inner wall surfaces of the upper and lower cartridge halves define a disc housing section for rotatably housing a disc therein. A disc supporting member formed of an elastic material is provided in the disc housing section for supporting a non-recording area of the disc. The disc supporting member has a disc end face supporting portion arranged along the inner peripheral surface of the circular rib for being protruded from the inner peripheral surface, an upper disc major surface supporting portion arranged along the inner wall surface of the upper cartridge half for being protruded from the inner wall surface, a lower disc major surface supporting portion arranged along the inner wall surface of the lower cartridge half for being protruded from the inner wall surface, with the disc supporting member being supported by being clamped between the upper cartridge half and the lower cartridge half.

Preferably, the inner peripheral surface of the disc end face supporting portion is a circular surface smaller in diameter than the inner peripheral surface of the circular rib.

Preferably, a protrusion is provided at a corner where the disc end face supporting portion intersects the upper or lower disc major surface supporting portion, and the upper and lower ends of the disc end face supporting portion are of increased thickness.

Preferably, the angle of intersection between the disc end face supporting portion and the upper or lower disc major surface supporting portion is set so as to be larger than 90°.

The disc cartridge of the present invention has the following advantages:

In a disc cartridge according to the present invention, in which the disc supporting member is clamped between the upper and lower cartridge halves, the disc supporting member is simpler in structure than in the conventional system and can be attached to the main cartridge body portion to lower the cost of the disc cartridge. Also, since not only the upper and lower major surfaces of the disc are elastically protected by the upper and lower disc end face supporting portions of the disc supporting member, but also the outer peripheral end face of the disc is elastically supported by the disc end face supporting portion, it becomes possible to prevent the disc damage or generation of resin powder debris otherwise caused due to shock or vibrations during transport or at the time of high speed loading/unloading in a juke box or the like. The result is a high reliability disc cartridge capable of recording/reproducing correct information signals for a prolonged time.

With the disc cartridge according to the present invention, in which the inner peripheral surface of the disc end face supporting portion of the disc supporting member is selected to be smaller in diameter than the inner peripheral surface of the circular rib, the outer peripheral end face of the disc can be reliably contacted with the disc end face supporting portion for protecting the outer peripheral end face of the disc and the inner periphery of the circular rib.

With the disc cartridge according to the present invention, in which the protrusion is provided at a corner where the disc end face supporting portion intersects the upper or lower disc major surface supporting portion for correspondingly increasing the thickness of the upper or lower end of the disc end face supporting portion, the disc end face, for example, can be protected more reliably.

With the disc cartridge according to the present invention, in which the angle θ between the disc end face supporting portion and the upper or lower disc major surface supporting portion is selected to be an obtuse angle (an angle exceeding 90°), the upper or lower disc major surface supporting portion is tightly contacted with the inner wall surface of the upper and lower cartridge halves, respectively, when the disc end face supporting portion is assembled in position between the upper and lower cartridge halves, thus preventing a gap from being produced between the inner wall surface and the upper or lower disc major surface supporting portion.

With the disc cartridge according to the present invention, the lateral side of the disc is supported by the guide portion of the stationary guide for softening the shock produced on collision. Thus, as compared to the conventional disc cartridge, there is no risk of the optical disc being contacted with the disc housing wall section during transport or movement to cause wear to the disc housing wall section to produce worn powder debris which then is affixed to the upper disc surface or to injure the disc.

In addition, since the disc cartridge is transported or inserted into or ejected from the continues recording and/or reproducing apparatus at an extremely high velocity, there is no such risk that the optical disc housed within the disc cartridge be vibrated excessively and brought into abrupt contact with the disc housing wall section to cause wear to the wall section to produce worn powder debris which then is affixed to the upper disc surface to obstruct the signal recording and/or reproduction.

BRIEF DESCRIPTION OF THE DRAWINGS

FIG. 22 is a cross-sectional view of a disc guide member of a disc cartridge according to the present invention.

DESCRIPTION OF THE PREFERRED EMBODIMENTS

Figure 1:
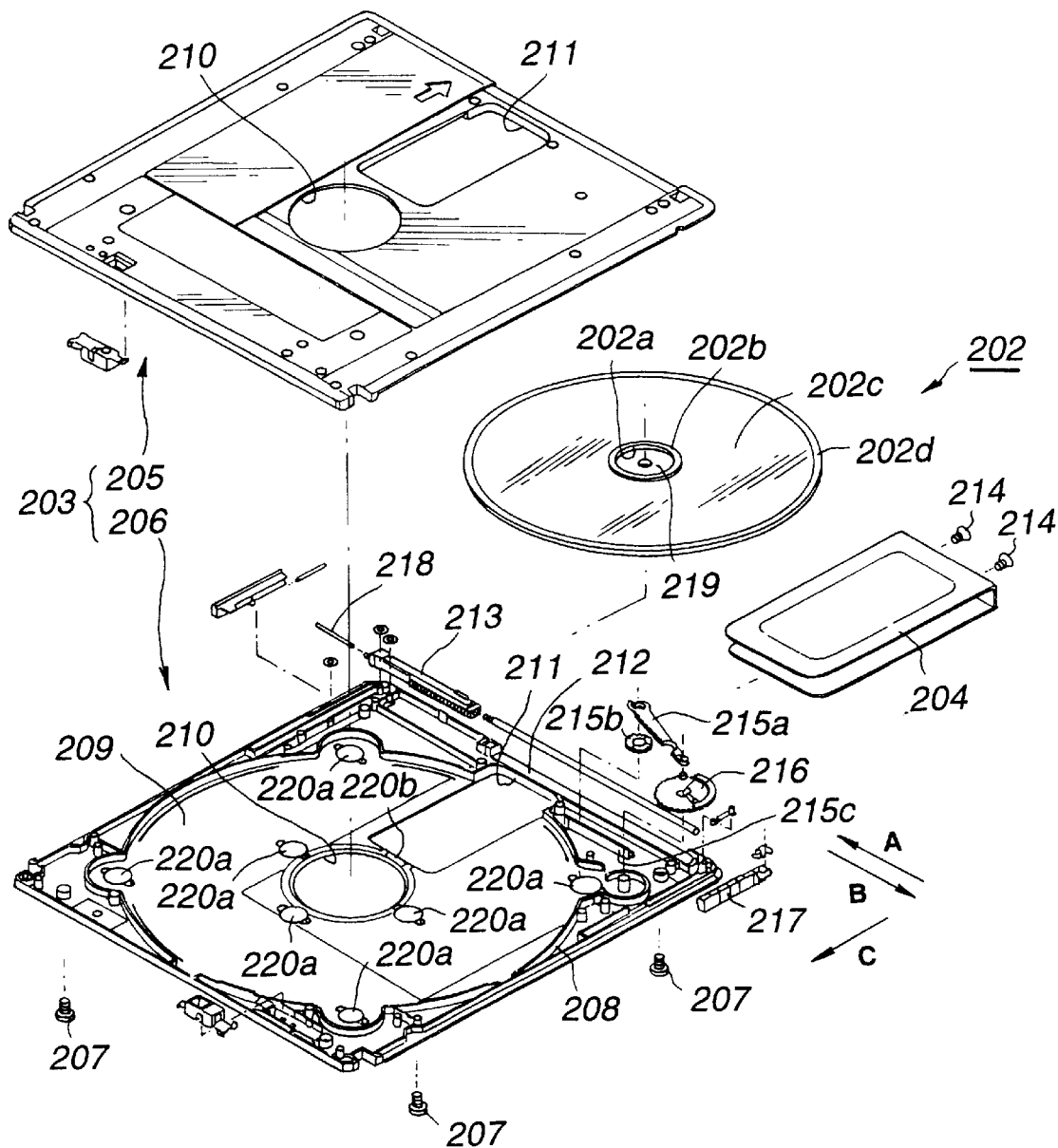
FIG. 1 is an exploded perspective view of a conventional disc cartridge.
Figure 2:
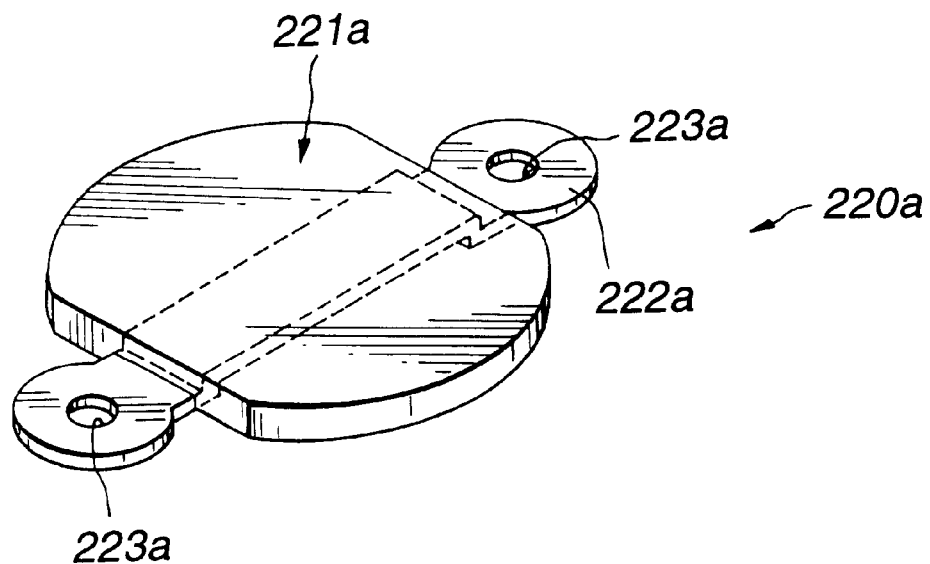
FIG. 2 is an exploded perspective view of a supporting member of the conventional disc cartridge.
Figure 3:
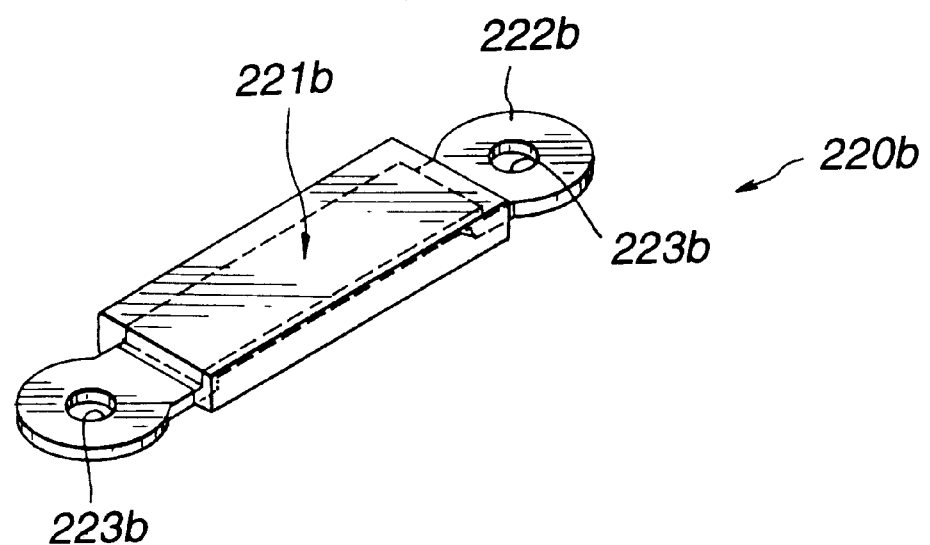
FIG. 3 is a perspective view of the supporting member of the conventional disc cartridge.

Referring to the drawings, preferred embodiments of the present invention will be explained in detail.

Figure 4:
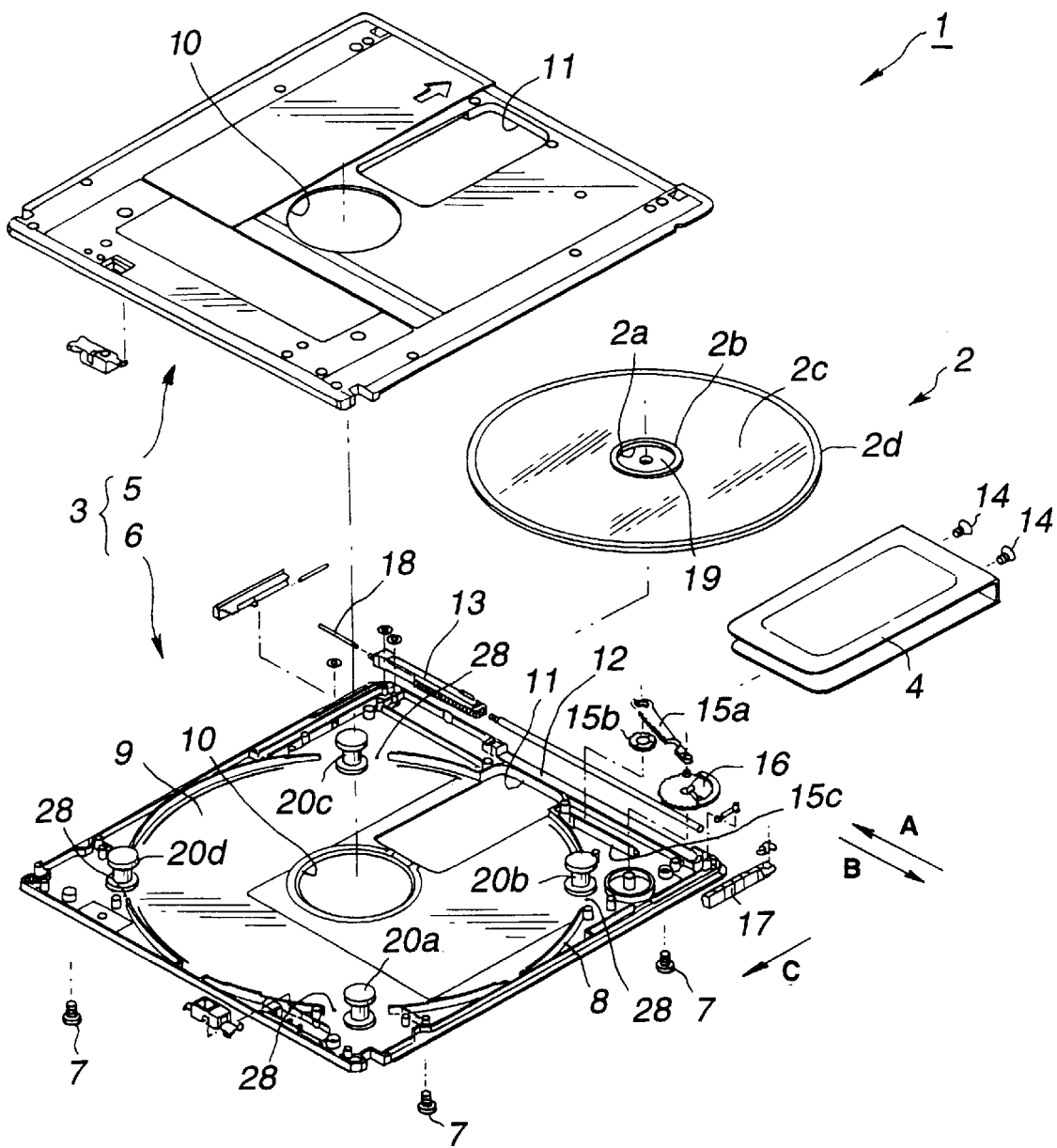
FIG. 4 is an exploded perspective view if a disc cartridge according to the present invention.

In FIG. 4, there is shown a disc cartridge 1, according to the present invention, comprised of a main cartridge body portion 3, rotatably housing therein an optical disc 2, and a shutter member 4 slidably mounted on the main cartridge body portion 3.

The main cartridge body portion 3 is made up of an upper cartridge half 5 and a lower cartridge half 6 abutted to each other and coupled to each other by plural set screws 7. The upper and lower cartridge halves 5, 6 are each substantially of in the shape of a saucer of shallow depth so that the main cartridge body portion 3 is in the shape of a planar box. The facing inner sides of the upper and lower cartridge halves 5, 6 delimit an arcuately-shaped disc housing wall section 8 in meeting with the outer rim of the optical disc 2 for constituting a disc housing section 9.

In view of possible thermal expansion and dimensional accuracy of the optical disc 2 and the upper and lower cartridge halves 5, 6, the disc housing section 9 is formed to be larger than the outer diameter of the optical disc 2 for preventing the risk that the disc housing section be smaller than the disc diameter or preventing the optical disc 2 from being contacted with the disc housing wall section 8 during disc rotation.

At a mid portion of the main cartridge body portion 3 is formed a disc table entrance aperture 10 which is in effect an upper circular aperture and a lower circular aperture. In proximity to this disc table entrance aperture 10 is formed a recording/reproducing aperture 11 which is in effect an upper rectangular aperture and a lower rectangular aperture. On the disc table entrance aperture 10 is slidably mounted a shutter member 4 for sliding along the front side of the main cartridge body portion 3 and for closing the recording/reproducing aperture 11.

The shutter member 4 is formed by warping a metallic plate, such as a thin stainless steel sheet, into a U-shape in cross-section, and is of a length sufficient to close the recording/reproducing aperture 11 The shutter member 4 is provided with a shutter guide member 13 fixedly mounted thereon. The shutter member 4 is secured to the shutter guide member 13 by setscrews 14, while the shutter guide member 13 is engaged in a guide groove 12 formed along the front side edge of the main cartridge body portion 3.

On the shutter member 4 is rotatably mounted an arm 15a via a pinion gear 15b meshing with a rack gear 15c. The arm 15a has its other end mounted on a gear 16 rotatably mounted at a corner of the main cartridge body portion 3. The gear 16 is engaged with an engagement portion 17 provided on a lateral side edge adjacent to the lateral side edge of the main cartridge body portion 3 provided with the guide groove 12.

In the non-use state, the above-described shutter mechanism locks the recording/reproducing aperture 11 in the close state, with the the shutter guide member 13 being then urged by a spring 18 in the direction shown by arrow A.

When the disc cartridge 1 is loaded on the recording/reproducing apparatus, the shutter guide member 13 is moved in a direction indicated by arrow B by an opening member configured for opening the shutter guide member 13 provided on the recording/reproducing apparatus. Thus, the shutter guide member 13 is moved in a direction indicated by arrow B against the force of the spring 18, at the same time as the engagement portion 17 is slid via arm 15a and gear 16 in a direction indicated by arrow C for unlocking the shutter mechanism for opening the recording/reproducing aperture 17.

The optical disc 2, rotatably housed within the above-described main cartridge body portion 3, is made up of an inner rim side non-recording area 2b, having a center aperture 2a, an information signal recording area 2c, on the radially outer side of the non-recording area 2b, and an outer rim side non-recording area 2d, on the radially outer side of the information signal recording area 2c.

The above-described optical disc 2 is fitted with a hub 19 having a center aperture engaged by a center spindle provided on the recording/reproducing apparatus for closing the center aperture 2a. This hub 19 is comprised of a ring member formed of a synthetic resin material and a metal plate having magnetically attracting properties on one end of the ring member. The hub 19 is exposed to outside via the disc table entrance aperture 10 formed in the disc cartridge 1.

When loaded on the recording/reproducing apparatus, the disc cartridge 1 has the center spindle engaged in the center aperture of the hub 19, with the optical disc 2 being magnetically chucked by the magnet for rotation in unison with the disc table.

The disc housing wall section 8 in the lower cartridge half 6 has plural interrupted portions 28 in which disc guide members 20a, 20b, 20c and 20d having the shock absorbing effect of absorbing the shock applied to the optical disc 2 such as is produced on loading the disc cartridge on the recording/reproducing apparatus are arranged at a pre-set interval. Each of the disc guide members 20a to 20d is made up of a boss, set on each of facing sides of the upper and lower cartridge halves 5, 6, and a stationary guide, not shown, fitted with the boss. The boss and the stationary guide portion will be explained in detail with reference to FIGS. 5 to 7.

Figure 5:
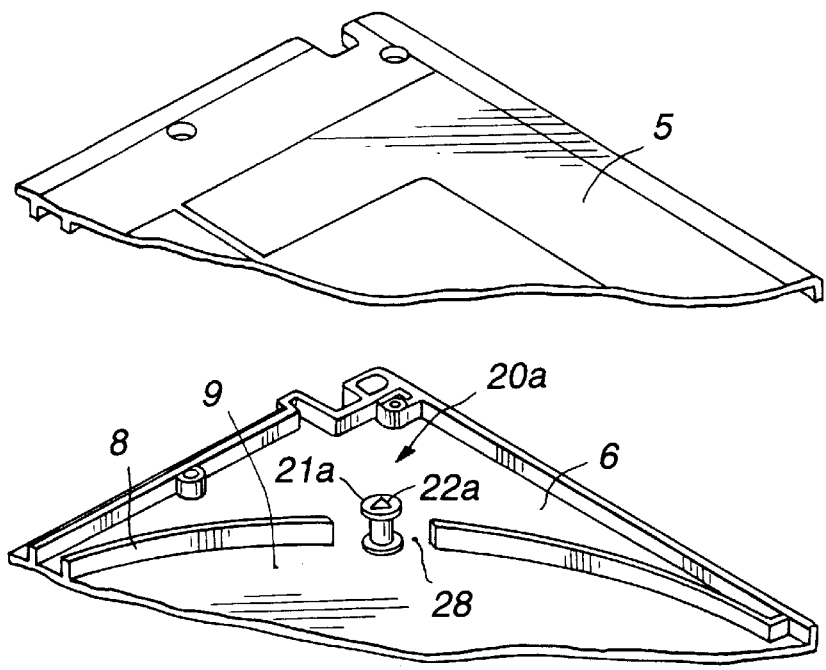
FIG. 5 is a schematic perspective view of the disc cartridge shown in FIG. 4.
Figure 6:
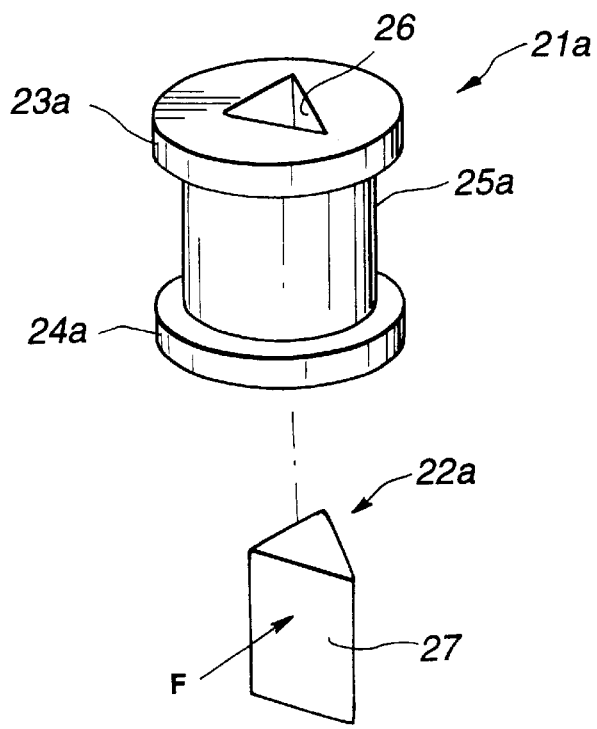
FIG. 6 is an exploded perspective view of a stationary guide and a boss of the disc cartridge shown in FIG. 4.
Figure 7:
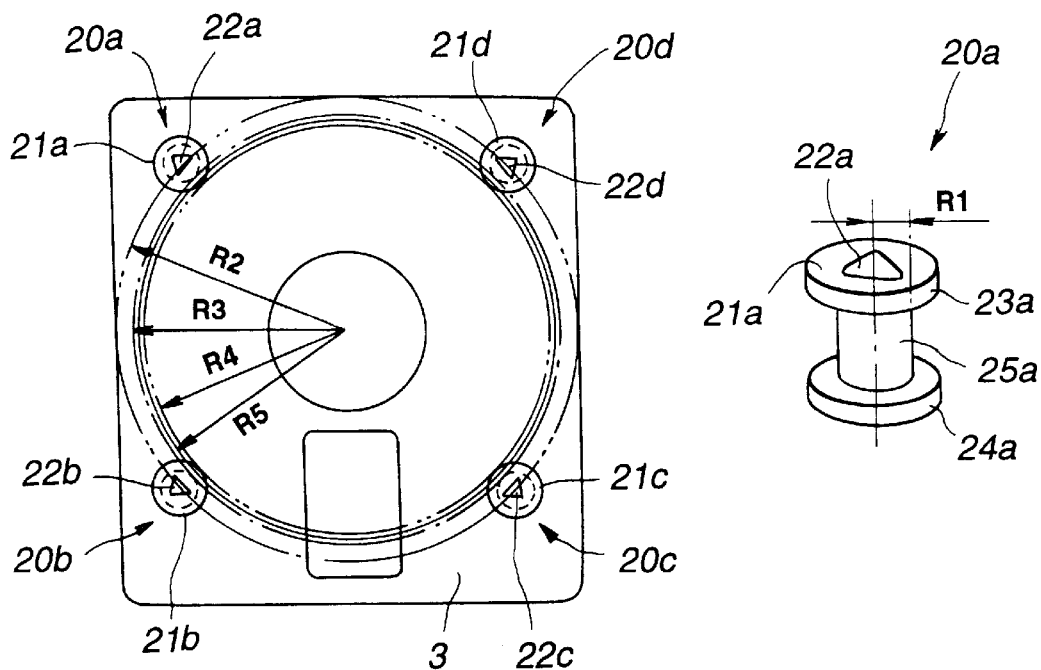
FIG. 7 is a plan view showing the mounting position of a disc guide member of the disc cartridge shown in FIG. 4, with the stationary guide being shown in perspective.

The disc guide member 20a has a boss 22a which is formed as one with the lower cartridge half 6 in the interrupted portion 28 of the disc housing wall section 8, and a stationary guide 21a fitted on the boss 22a, as shown in FIGS. 5 and 6. The stationary guide 21a is formed of wear-resistant resins, such as nylon resin, polyacetal resin, polybutylene terephthalate resin or high-density polyethylene resin, or an elastic material having high shock-absorbing performance such as silicon rubber, urethane rubber or styrene-butadiene rubber.

The boss 22a is substantially triangular in shape, with a collision surface 27 corresponding to the direction of collision F of the stationary guide, for functioning for supporting the shock on collision of the lateral side edge of the disc against the stationary guide.

The stationary guide 21a is made up of a substantially columnar-shaped guide 25a, functioning for absorbing the shock on collision against the lateral side edge of the optical disc 2, and a pair of flange portions 23a, 24a of similar shape to each other and provided for extending outwards on upper and lower side edges of the guide 25a. These flange portions 23a, 24a support an outer rim side non-recording area 2d of the optical disc 2 for preventing the signal recording area 2c of the optical disc 2 from being directly contacted with the side of the main cartridge body portion 3 making up the disc housing section 9. The stationary guide 21a is formed with a fitting center hole 26 substantially triangular in cross-section for mating with the boss 22a.

The boss 22a and the fitting center hole 26 of the stationary guide 21a each having a substantially triangular cross-section prevent the stationary guide 21a from being rotated relative to the boss 21a.

The disc guide members 20b, 20c and 20d are shaped similarly to the disc guide member 20a, that is, the bosses 22b, 22c and 22d substantially triangular in cross-section are fitted in the similarly shaped fitting holes formed in the stationary guide portions 21b, 21c and 21d, respectively. Each of the stationary guide portions 21b, 21c and 21d has a substantially columnar-shaped guide portion and a flange portion extending outwards from both lateral side edges of the guide portion. Since the stationary guide portions 21b, 21c and 21d are otherwise similar to the stationary guide 21a, the detailed explanation is omitted for simplicity.

Each of the stationary guides 21a, 21b, 21c and 21d is placed at each corner of the substantially square-shaped lower cartridge half 6 on a circumference of a circle having a radius of a circle centered about the disc table entrance aperture R2=R5+R1, wherein R5 denotes the radius of the optical disc 2 and R1 denotes the radius of the stationary guide 21a of the disc guide member 20a.

It should be noted that a radius R3 of an imaginary circle obtained by interconnecting the radially inner edges of the guide portion 25a of the stationary guide 21a and similar guides of the stationary guide portions 21b, 21c and 21d is larger than the radius R5 of the optical disc 2. It should be noted that a radius R4 of an imaginary circle obtained by interconnecting the radially inner edges of the lower flange portion 24a of the stationary guide 21a and similar lower flange portions of the stationary guide portions 21b, 21c and 21d is smaller than the radius R5 of the optical disc 2, and that the respective flanges of the stationary guide portions are not contacted with the information signal area 2c of the optical disc 2.

Figure 8:
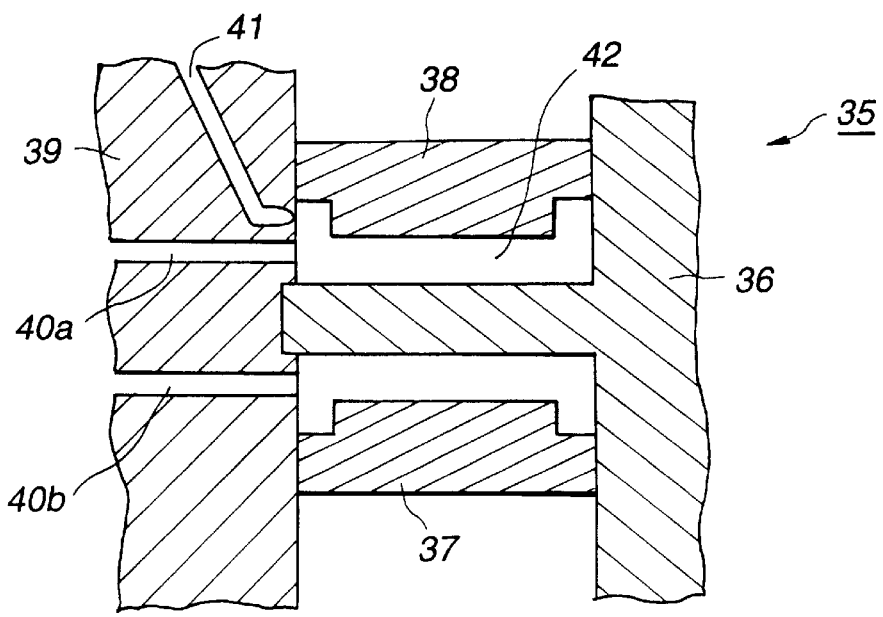
FIG. 8 is a schematic longitudinal cross-sectional view of a metal mold device used for producing a stationary guide of the disc cartridge, with the metal mold device being shown in the mold clamp state.

Th stationary guide 21a, made up of the substantially columnar-shaped guide portion 25a and the flanges 23a, 24a formed on the upper and lower sides of the guide portion 25a, as described above, is produced by a metal mold device 35 now explained. that is, the metal mold device 35 is provided with draft molds 37, 38 for forming the outer peripheral sides of the guide portion 25a and the outer peripheral sides of the upper and lower flange portions 23a, 24a, a lower mold 39 for forming the lower surface of the lower flange portion 23a and an upper mold 36 for forming the fitting hole 26 in the stationary guide 21a and the upper surface of the upper flange portion 23a, as shown in FIG. 8. The molten resin material is introduced into a cavity 42 of the metal mold device via a nozzle 41 mounted on the lower mold 39. After the resin material charged into the metal mold device 35 is cooled and solidified, the upper mold 36 is slid, and subsequently the draft molds 37, 38 are slid and removed. An ejection pin 40 of the lower mold 39 is actuated for ejecting the molded product for producing the stationary guide 21a.

The stationary guides 21b, 21c and 21d are similar in structure to the stationary guide 21a and produced in a similar manner.

Figure 9:
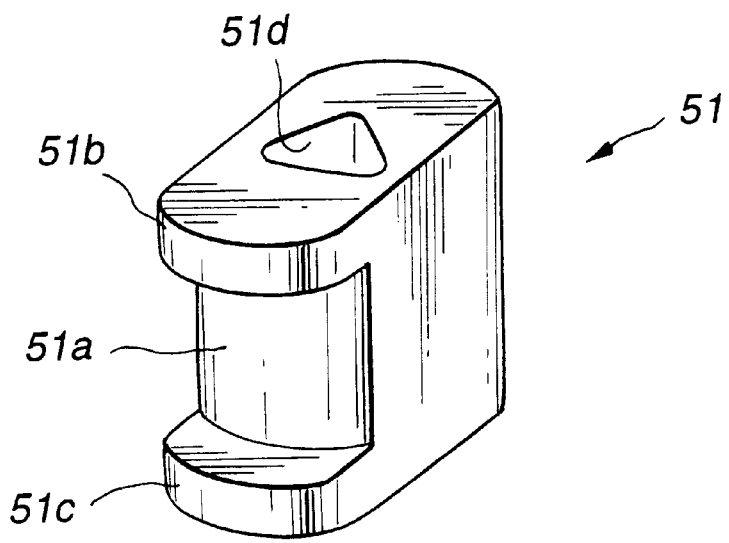
FIG. 9 is a perspective view of a modified stationary guide of a disc cartridge according to the present invention.
Figure 10:
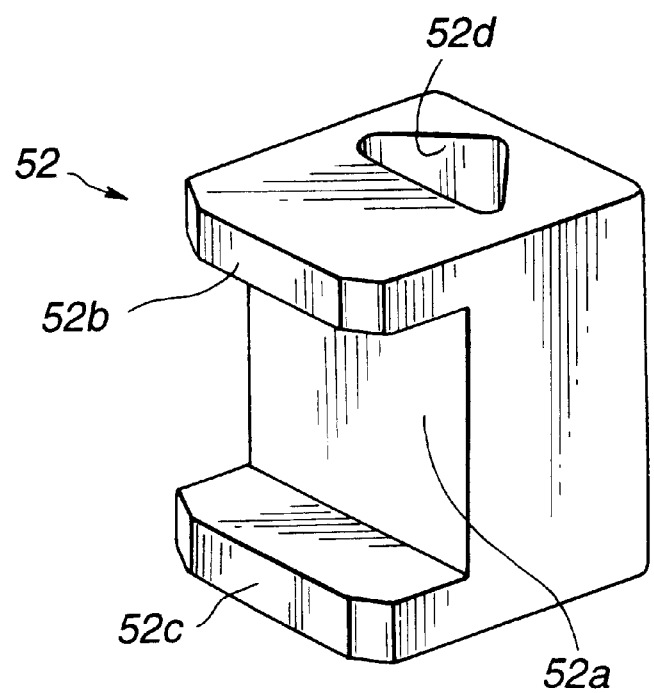
FIG. 10 is a perspective view of another modified stationary guide of a disc cartridge according to the present invention.

Each of the stationary guide members 20a to 20d is not limited to the above-described structure, but may also be made up of stationary guides 51, 52 shown in FIGS. 9 and 10, respectively.

That is, the stationary guide 51 is made up of a guide portion 51a substantially in the form of an elliptical pillar and a pair of flange portions 51b, 51c only in portions thereof holding the optical disc 2. The stationary guide 51 has a fitting center hole 51d substantially triangular-shaped in cross-section and is fitted in a boss, not shown, formed as one with the lower cartridge half 6. The boss is substantially of a triangular pyramid in cross-section.

The stationary guide 52 is made up of a guide portion 51a substantially in the form of a square-shaped pillar and a pair of flange portions 52b, 52c only in portions thereof holding the optical disc 2. The stationary guide 52 has a fitting center hole 52d substantially triangular-shaped in cross-section and is fitted in a boss, not shown, formed as one with the lower cartridge half 6. The boss is substantially of a triangular pyramid in cross-section.

Figure 11:
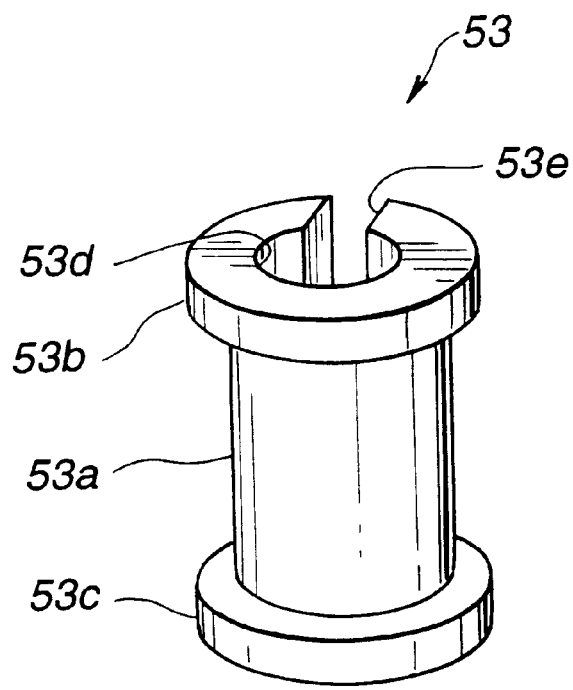
FIG. 11 is a perspective view of still another modified stationary guide of a disc cartridge according to the present invention.
Figure 12:
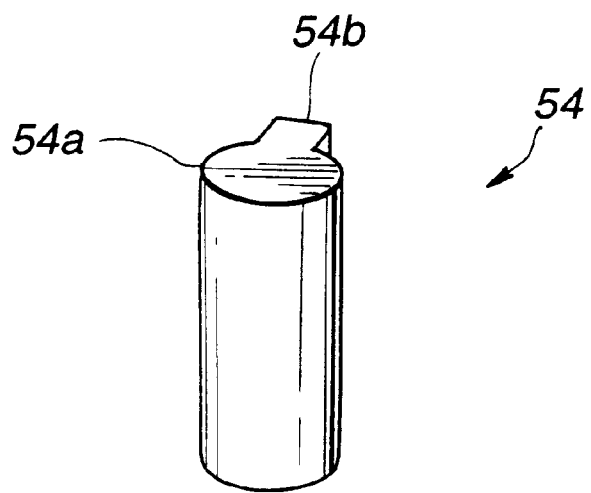
FIG. 12 is a perspective view of a modified boss of a disc cartridge according to the present invention.

FIG. 11 shows a stationary guide 53 made up of a guide portion 53a substantially in the form of a circular column and a pair of flanges 53b, 53c extending outwards from upper and lower lateral side edges of the guide portion 53a. The stationary guide 53 has a substantially circular center fitting hole 53d from which is radially extended a cut-out 53e reaching the outer rim portion. The stationary guide is adapted for cooperating with a boss 54 (FIG. 12) made up of a substantially columnar-shaped portion 54a fitted in the fitting hole 53d and a rib 54b engaged in the cut-out 53e.

Such stationary guides 51 to 53 suffice which are of shape and thickness sufficient to withstand the shock produced on collision against the lateral side of the optical disc 2 and which cannot be rotated relative to the boss.

In the above-described disc cartridge 1, four disc guide members 20a to 20d are provided on the lower cartridge half 6. However, there is no particular limitation to the number of the disc guide members.

Figure 13:
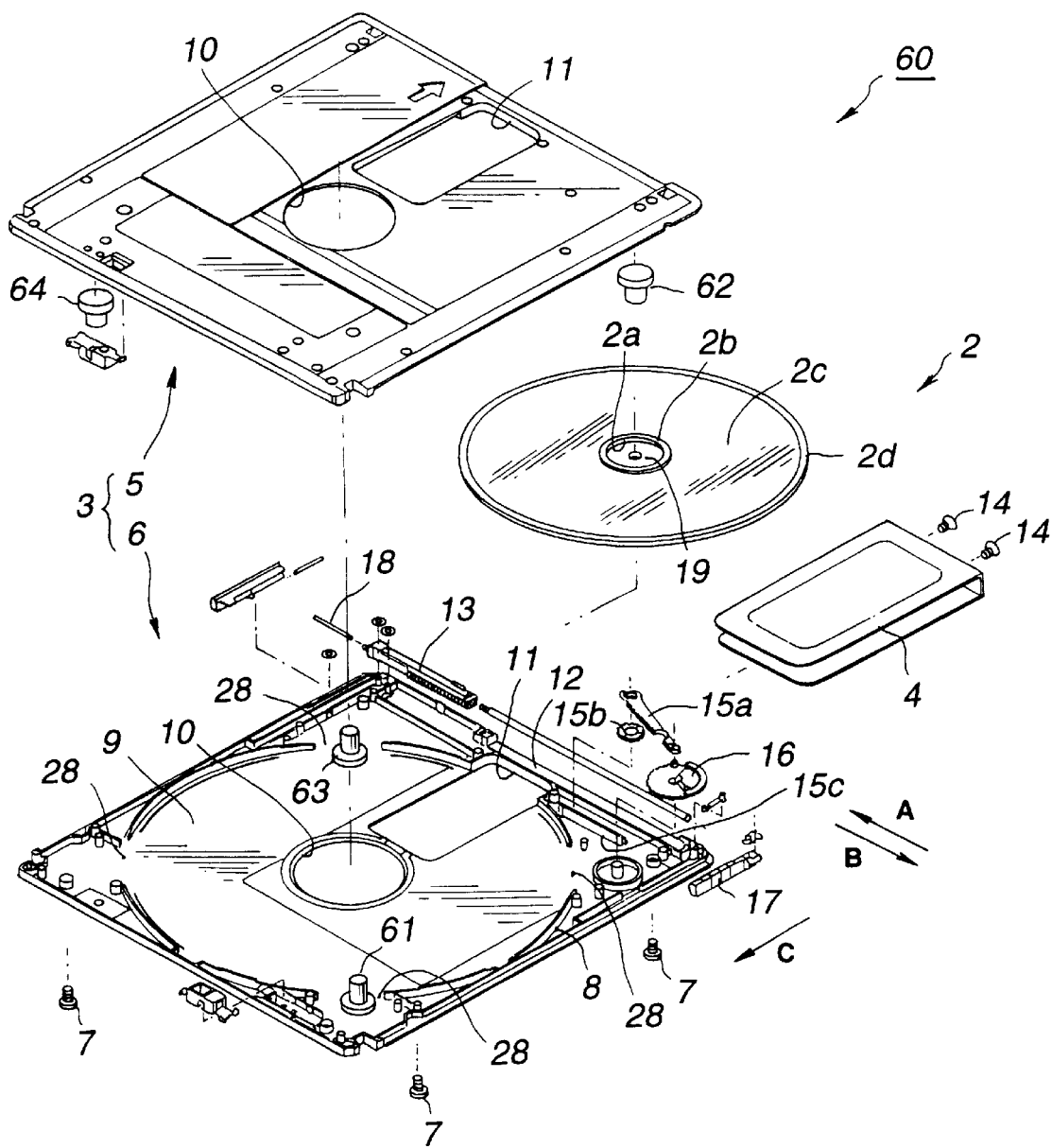
FIG. 13 is an exploded perspective view of a modified disc cartridge according to the present invention.

FIG. 13 shows a disc cartridge 60 of a second embodiment in which two of four disc guide members 61 to 64 are provided on the upper cartridge half 5 and the remaining two disc guide members are provided on the lower cartridge half 6. The parts or components equivalent to those of the above-described disc cartridge 1 are denoted by the same reference numerals and are not explained for simplicity.

The disc guide members 61, 63 are arranged on the lower cartridge half 6 on a diagonal line on both sides of a disc table entrance aperture 10. The disc guide members 62, 64 are arranged on the upper cartridge half 6 on a diagonal line at different positions from those of the disc guide members 61, 63 on both sides of a disc table entrance aperture 10. The operation similar to that of the disc cartridge 1 may be realized by arranging the disc guide members on the upper cartridge half 5 in a staggered relation with respect to those on the lower cartridge half 6.

Figure 14:
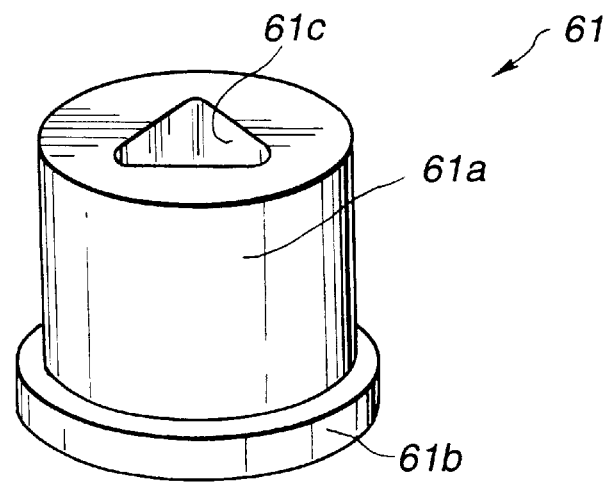
FIG. 14 is a perspective view of yet another modified stationary guide of a disc cartridge according to the present invention.

Referring to FIG. 14, the stationary guide 61 is made up of a substantially columnar-shaped guide portion 61a, adapted for receiving the lateral side edge of the optical disc 2 for softening the shock produced on collision on the disc, and a flange portion 61b formed for extending outwards from the lower edge of the guide portion 61a. The flange portion 61b supports the outer rim side non-recording area 2d of the optical disc 2 for preventing the information signal recording area 2c of the optical disc 2 from being directly contacted with the surface of the disc cartridge 60 constituting the disc housing section 9.

The stationary guide 61 has a substantially triangular center fitting hole 61c into which is fitted a substantially triangular boss, not shown, formed as one with the lower cartridge half 6, so that the surface having the flange portion 61b is directed to the surface of the disc housing section 9.

The stationary guides 62 to 62 are constructed similarly to the stationary guide 61. Specifically, the stationary guide 63 is provided on the lower cartridge half 6 so that the its flanged surface is directed to the surface of the disc housing section 9 and the stationary guides 62, 64 are provided on the upper cartridge half 5 so that the flanged surfaces thereof are directed to the surface of the disc housing section, not shown in FIG. 13. Meanwhile, the disc housing section of the upper cartridge half 5 is the housing section of the optical disc 2 facing the disc housing section 9 of the lower cartridge half 6.

Figure 15:
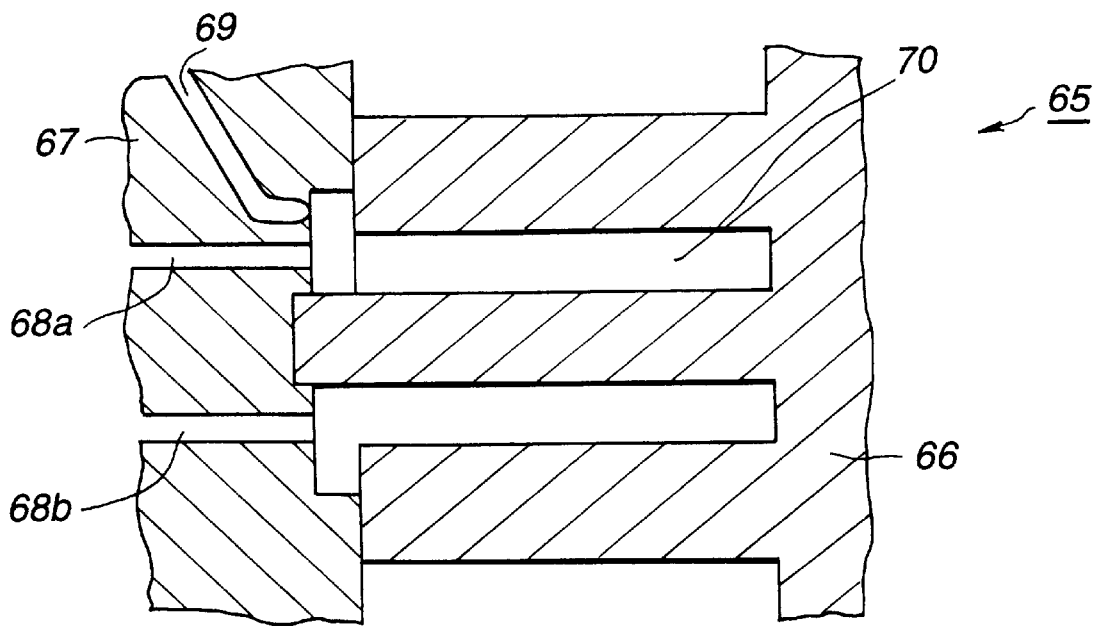
FIG. 15 is a schematic longitudinal cross-sectional view of a metal mold device used for producing a modified stationary guide of the disc cartridge, with the metal mold device being shown in the mold clamp state.

The stationary guide 61, made up of the substantially columnar-shaped guide portion 61a and the flange portion 61b extending outwards from the lower lateral side of the guide portion 61a, is produced by a metal mold device 65. That is, the metal mold device 65 has an upper mold 66 for forming the outer peripheral surface and the upper part of the guide portion 61a and for forming the fitting hole 61c of the stationary guide 61 and a lower mold 67 for forming the outer peripheral surface and the lower surface of the lower flange portion 61b, thereby defining a cavity 70, as shown in FIG. 15. In the above-described metal mold device 65, molten resin is injected and charged into the cavity 70 via a nozzle 69 mounted on the lower mold 67. After the resin charged into the metal mold device 70 is cooled and solidified, and the upper mold 66 is slid and ejected, and an ejection pin 68 of the lower mold 67 is actuated for extruding the molded article for producing the stationary guide 61.

The stationary guides 61 to 64 of the disc cartridge 60 are designed with one-side flanges for correspondingly reducing the manufacturing cost. In addition, since the stationary guides 61 to 64 can be manufactured using the metal mold device 65 simpler in structure than the metal mold device 25, the metal mold may be produced at lower cost. Moreover, the molding time for producing the stationary guide may be reduced because of the smaller number of guide molding process steps.

The disc cartridge 60 can be assembled by a simpler operation of first arranging the stationary guides 61, 63 on the lower cartridge half 6, placing the optical disc 2 so that the outer peripheral non-recording area 2d thereof in contact with the flange portion 61b of the stationary guide 61 and with the flange portion of the stationary guide 63 and applying the upper cartridge half 5 fitted with the stationary guides 62, 64 on the resulting assembly.

Figure 16:
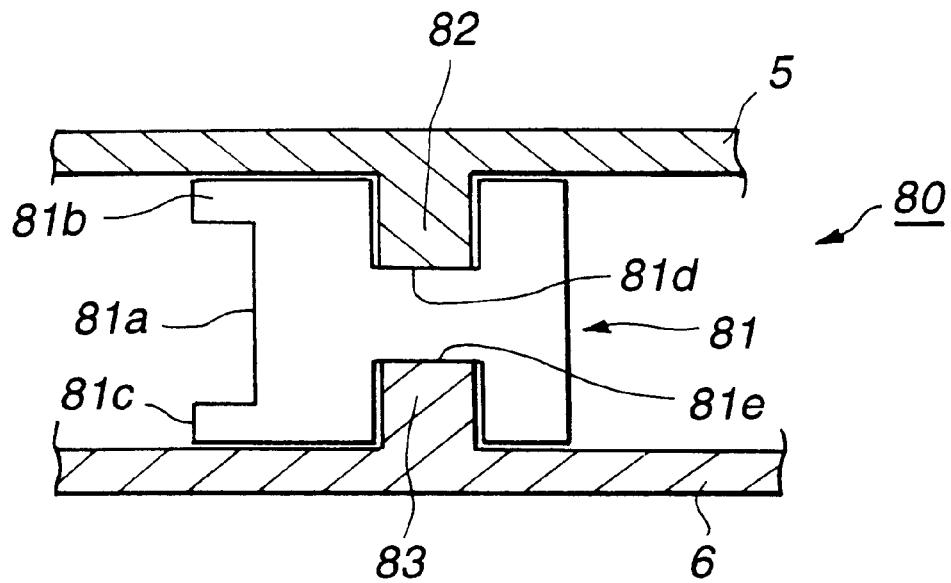
FIG. 16 is a cross-sectional view showing a disc guide member of a modified disc cartridge according to the present invention.

FIG. 16 shows a disc cartridge of a third embodiment having a disc guide member 80 in which a stationary guide 81 has a blind fitting hole for receiving bosses 82, 83 of the stationary guide 81.

These bosses 82, 83 are formed on the upper cartridge half 5 and on the lower cartridge half 6, respectively, and fitted into blind boss fitting holes 81d, 81e formed at mid portions of the stationary guide 81, respectively.

The stationary guide 81 is provided with flange portions 81b, 81c only in the portions thereof holding the optical disc 2 in cooperation with the guide portion 81a.

The stationary guide 81, in which the bosses 82, 83 formed upright on the upper and lower cartridge halves 5, 6 can be reduced in length, may be improved in strength while the function similar to that of the disc cartridge 1 is assured. In addition, the stationary guide 81 may be improved in ease in molding and the effect of holding the guide fitted thereon. The stationary guide 81 may be fabricated by the material and the technique described in connection with the stationary guide 25.

Figure 17:
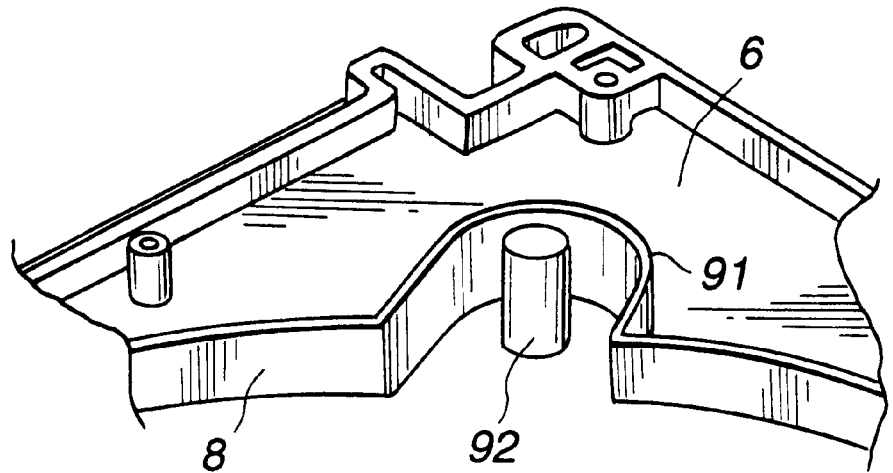
FIG. 17 is a schematic perspective view showing a modified disc cartridge according to the present invention.

FIG. 17 shows a disc cartridge of a fourth embodiment in which a disc guide member 92 is arranged on a mounting portion formed by an upstanding wall 91 formed in continuation to and at back of the disc housing wall section 8.

By forming the upstanding wall section 91 in this manner at back of the disc guide member 92, it; becomes possible to assure strength of the large-sized disc cartridge and the dust-proofing effect. This upstanding wall 91 may be formed easily by engraving the corresponding portion in the metal mold used for molding the cartridge half.

Figure 18:
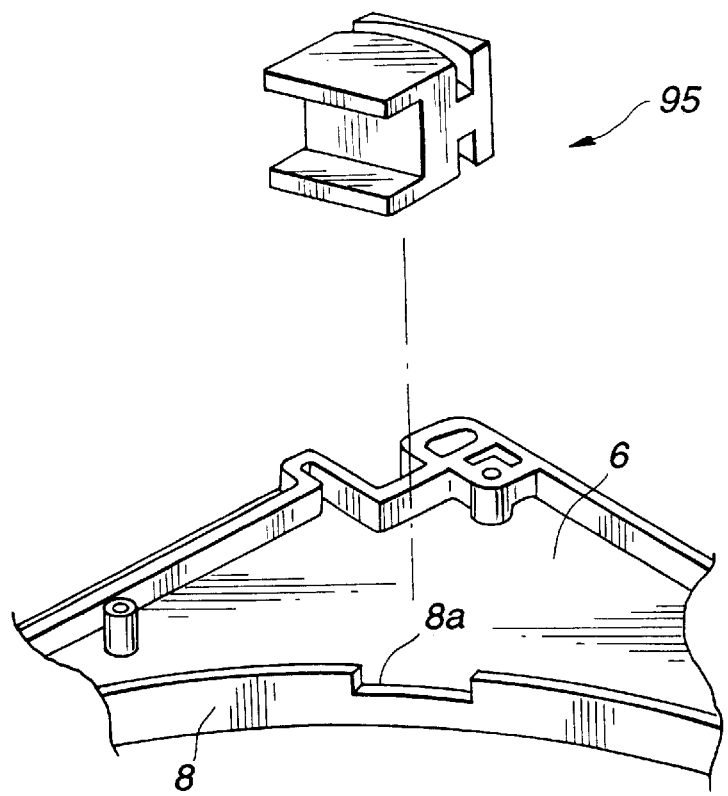
FIG. 18 is a schematic perspective view showing a further modified disc cartridge according to the present invention.
Figure 19:
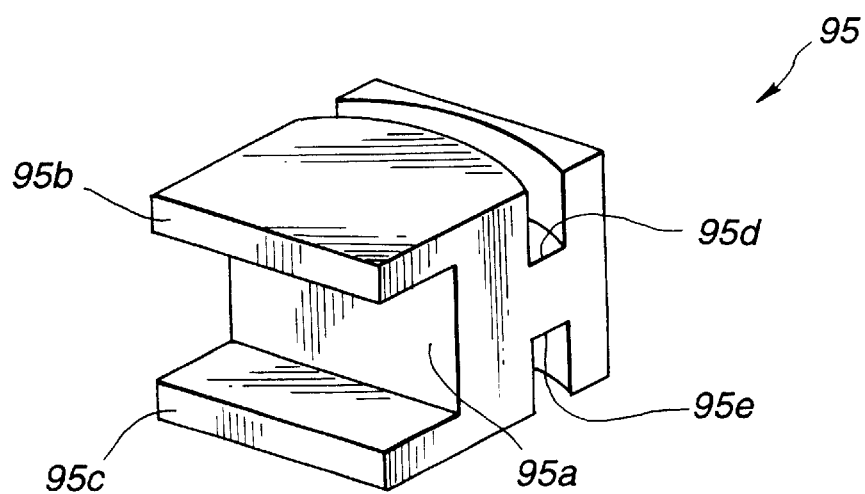
FIG. 19 is a perspective view showing a further modified stationary guide of a disc cartridge according to the present invention.

In a disc cartridge according to a fifth embodiment, the stationary guide is not fitted on the upper cartridge or on the boss set upright on the lower cartridge half, but a stationary guide having a fitting groove is fitted on the disc housing wall section. Referring to FIG. 18, a stationary guide 95 is fitted on an intermediate step 8a in the disc housing wall section of the lower cartridge half 6 and on an intermediate step, not shown, in the disc housing wall section of the upper cartridge half 5. The length of the intermediate step 8a in the disc housing wall section of the lower cartridge half 6 and that of the an intermediate step, not shown, in the disc housing wall section of the upper cartridge half 5 are equal to the width of the stationary guide 95, while the depth of the intermediate steps is sufficient to permit the steps to be fitted with the fitting grooves in the stationary guide 95 to support the stationary guide 95 in stability.

The stationary guide 95 is formed with flange portions 95b, 95c only in portions thereof supporting the optical disc 2 in cooperation with a square-shaped guide portion 95a. The stationary guide 95 is formed with a fitting groove 95e fitted with the intermediate step 8a in the disc housing section of the lower cartridge half 6 and a fitting groove 95d fitted with the intermediate step formed in the disc housing section of the upper cartridge half 5.

The disc guide member, formed by fitting the stationary guide on the intermediate steps of the upper and lower cartridge halves, gives favorable effects similar to those of the disc guide member constructed by fitting the stationary guide on the boss set on interrupted portions of the disc housing wall section.

Figure 20:
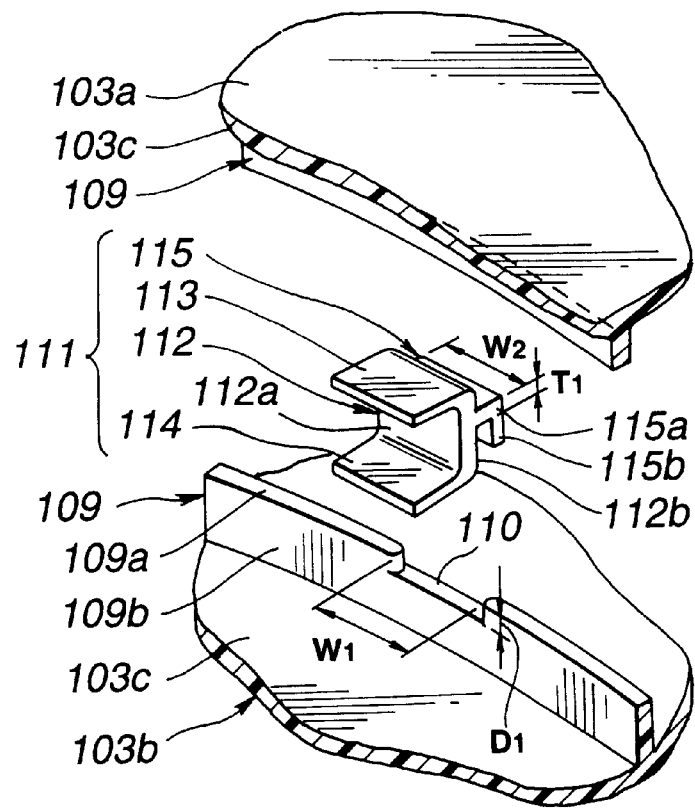
FIG. 20 is a schematic perspective view showing another modified disc cartridge according to the present invention.

FIG. 20 shows a disc cartridge of a sixth embodiment in which a disc supporting member mounting portion 110 is formed by recessing a portion of an upper surface 109a of a circular rib 109 to a pre-set width W1 and to a pre-set depth D1.

The disc supporting member 111 includes a disc end face supporting portion 112 extending along an inner peripheral surface 109b of the circular rib 109 for being protruded from the surface 109b, and an upper disc major surface supporting portion 113 connected to an upper end towards the inner peripheral surface 112a of the disc end face supporting portion 112 for extending along an inner wall surface 103c of the upper cartridge half 103a for being protruded from the wall surface 103c. The disc supporting member 111 also includes a lower disc major surface supporting portion 114 connected to a lower end towards the inner peripheral surface 112a of the disc end face supporting portion 112 for extending along an inner wall surface 103c of the upper cartridge half 103a for being protruded from the wall surface 103c and a hook portion 115 connected to an outer peripheral surface of the disc end face supporting surface 112 for being engaged with the circular rib 109. The disc supporting member 111 is formed integrally of an elastic material, including rubber, such as silicone rubber, or plastics. The disc end face supporting portion 112 has an inner peripheral surface 112a which is formed as an arcuate surface (circular surface) smaller in diameter than the circular rib 109.

The hook portion 115 has a horizontal portion 115a connected at a right angle to the outer peripheral surface 112b of the disc end face supporting portion 112 and a vertical portion 115b connected to the distal end of the horizontal portion 115a for extending parallel to the outer peripheral surface 112b of the disc end face supporting portion 112.

Figure 21:
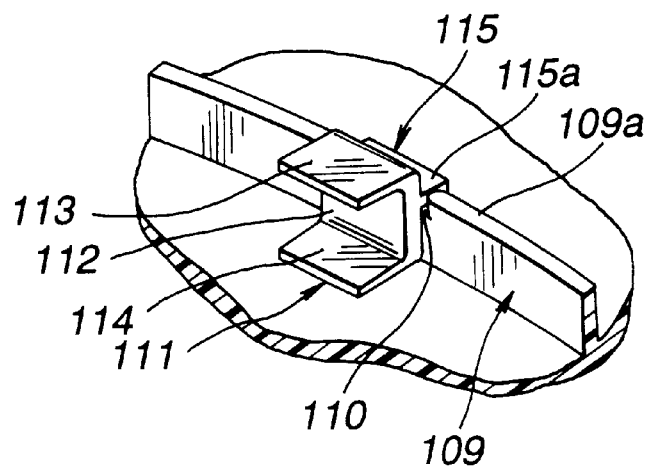
FIG. 21 is a schematic perspective view showing further modified disc cartridge according to the present invention.
Figure 23:
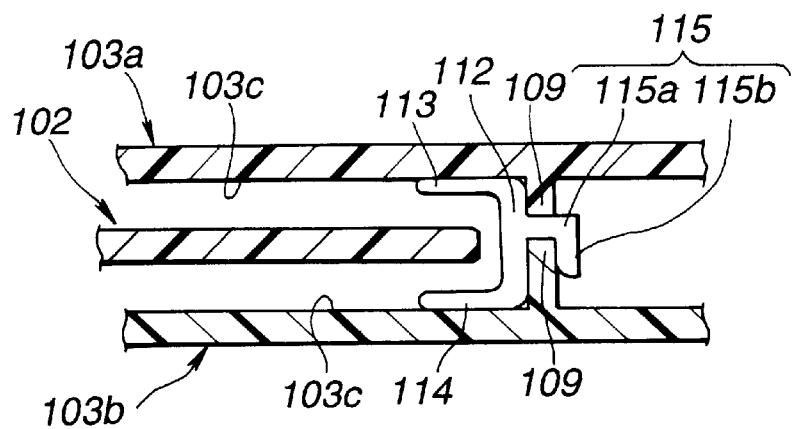
FIG. 23 is a cross-sectional view of a modified disc guide member of a disc cartridge according to the present invention.
Figure 24:
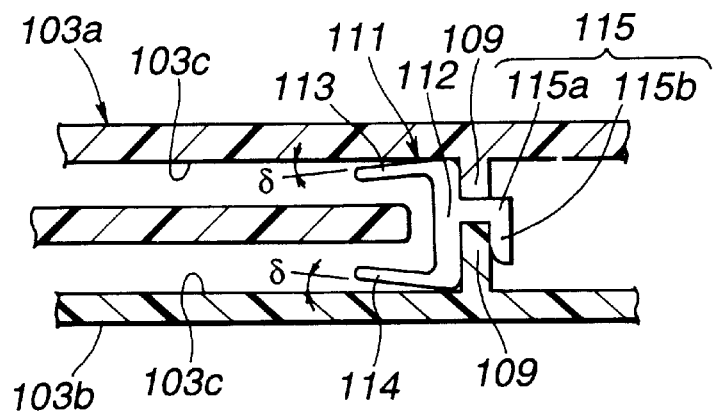
FIG. 24 is a cross-sectional view of a further modified disc guide member of a disc cartridge according to the present invention.
Figure 25:
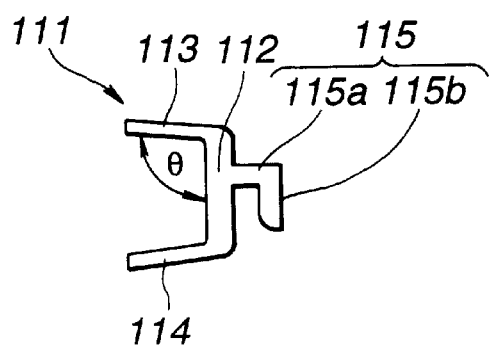
FIG. 25 is a side view showing a disc supporting member of a modified disc cartridge according to the present invention.

The horizontal portion 115a has a width $W_2$ and a thickness $T_1$ substantially equal to the width $W_1$ and depth $D_1$ of the disc supporting member mounting portion 110, such that, if the flange portion 115 is engaged with the circular rib 19 as shown in FIG. 21, the horizontal portion 115a is fitted within the disc supporting member mounting portion 110, with the upper surface of the horizontal portion 115a lying flush with the upper surface 109a of the circular rib 109.

If the disc supporting members 111 are mounted on the disc supporting member mounting portions 110, 110, . . . , the outer rim of the optical disc 102 is introduced into a space between the upper disc major surface supporting portions 113 and the lower disc major surface supporting portions 114, and the upper cartridge half 103a is placed on the lower cartridge half 103b with the ends of the circular ribs 109, 109 abutting against each other, the horizontal portions 115a of the hook portions 115 are clamped between the circular ribs 109, 109 of the upper and lower cartridge halves 103a, 103b, while the upper and lower disc major surface supporting portions 113, 114 are clamped between the inner wall surfaces 103c, 103c of the upper and lower cartridge halves 103a, 103b. The optical disc 102 has the non-recording area 102b on the radially outer side of the recording area 102a supported by the lower disc major surface supporting portion 114 of the disc supporting member 111 for preventing the recording area 102a of the disc 102 from being contacted with the inner wall surfaces 103c of the upper and lower cartridge halves 103a, 103b. If the disc cartridge 101 is inverted upside-down from the position shown in FIG. 22A, the optical disc 102 has the non-recording area 102b on the radially outer side of the recording area 102a supported by the upper disc major surface supporting area 113 of the disc supporting member 111 for preventing the recording area 102a from being contacted with the inner wall surfaces 103c of the upper and lower cartridge halves 103a, 103b.

If the disc cartridge 101 is tilted or set upright, as shown in FIG. 22C, the disc 102 has its outer peripheral end face 102c supported by the disc end face supporting portion 112 of the disc supporting member 111 for preventing the outer peripheral end face 102c from being contacted with the inner peripheral surface 109b of the circular rib 109.

If the disc cartridge 101 is inserted into the recording/reproducing apparatus for use, the disc 102 is chucked by a spindle motor of the recording/reproducing apparatus and raised to a height level intermediate between the upper and lower cartridge halves 103a, 103b out of contact with the disc end face supporting portion 112 or with the upper and lower disc major surface supporting portions 113, 114 of the disc supporting member 111 so as to be free for rotation. Meanwhile, in order to prevent a gap δ from being produced between the inner wall surface 103c of the upper cartridge half 103a and the upper disc major surface supporting portion 113 of the disc supporting member 111 or between the inner wall surface 103c of the lower cartridge half 103b and the lower disc major surface supporting portion 114 of the disc supporting member 111, the angle between the disc end face supporting portion 112 of the disc supporting member 111 and the major surface supporting member 113 or 114 is selected to be an obtuse angle θ.

Figure 26:
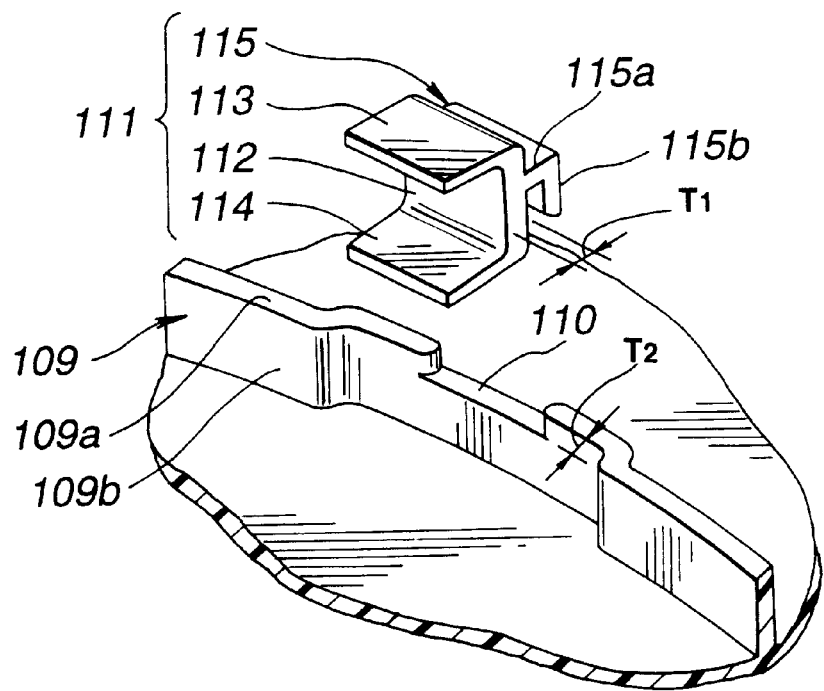
FIG. 26 is a schematic perspective view of a further modified disc cartridge according to the present invention.
Figure 27:
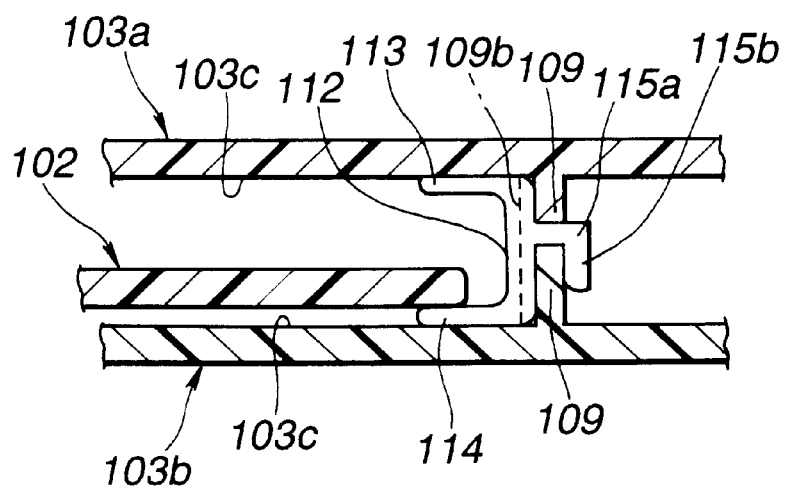
FIG. 27 is a cross-sectional view of a further modified disc guide member of a disc cartridge according to the present invention.

In a disc cartridge according to a seventh embodiment, if it is necessary to reduce the diameter of the circular rib 109 for reducing the size of the disc cartridge 101, the circular rib 109 is recessed towards a radially inner side except the disc supporting member supporting portion 110, as shown in FIGS. 26 and 27. The amount of recession $T_2$ is selected to be smaller than the thickness $T_1$ of the disc end face supporting portion 112 of the disc supporting member 111, so that the disc end face supporting portion 112 is protruded from the inner peripheral surface 109b of the circular rib 109 in an amount corresponding to the thickness $T_1$ less the amount of protrusion $T_2(T_1-T_2)$. In the arrangement shown in FIGS. 26 and 27, the effect of the disc supporting member 11 in supporting the disc end face supporting portion 112 is reduced.

Figure 28:
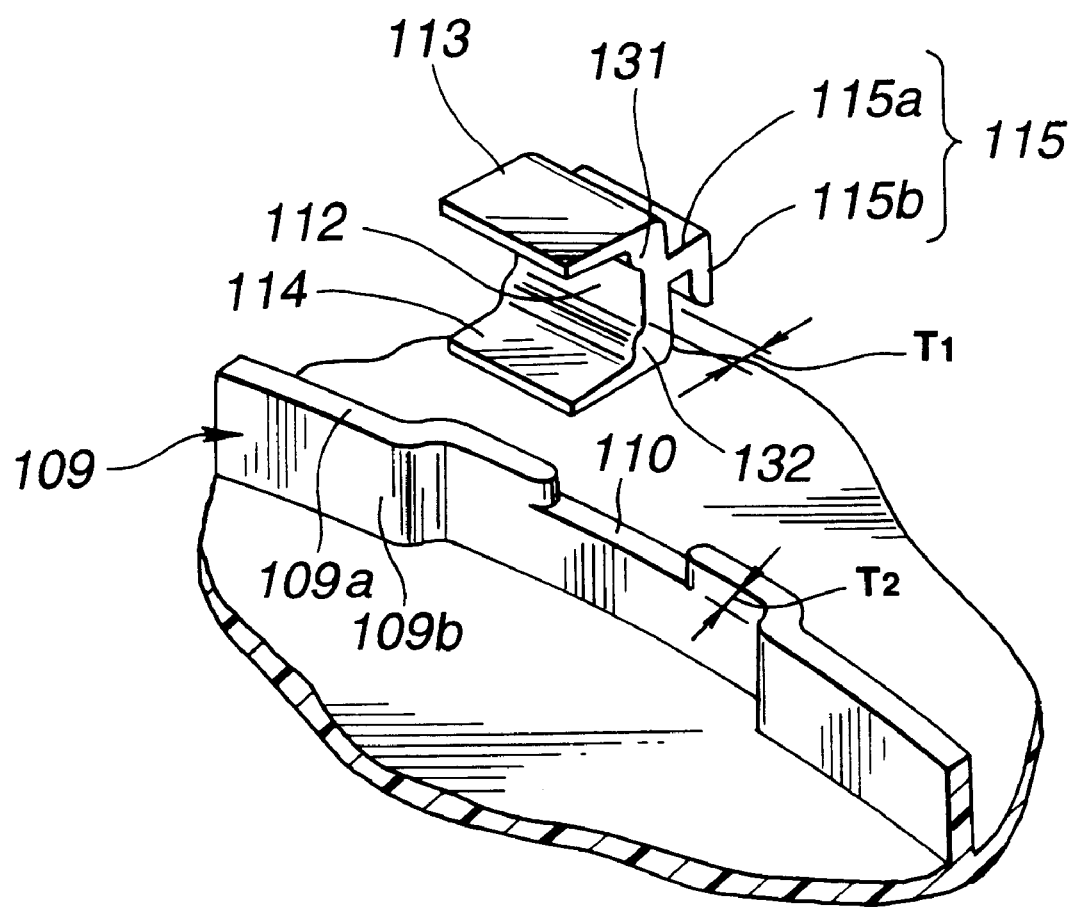
FIG. 28 is a schematic perspective view of a further modified disc cartridge according to the present invention.
Figure 29:
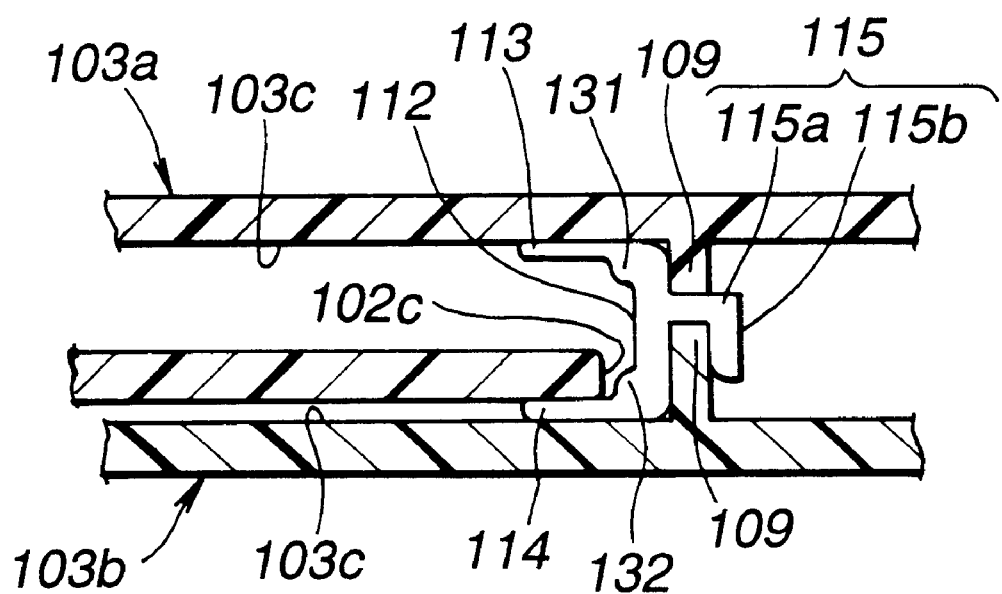
FIG. 29 is a cross-sectional view of a further modified disc guide member of a disc cartridge according to the present invention.
Figure 30:
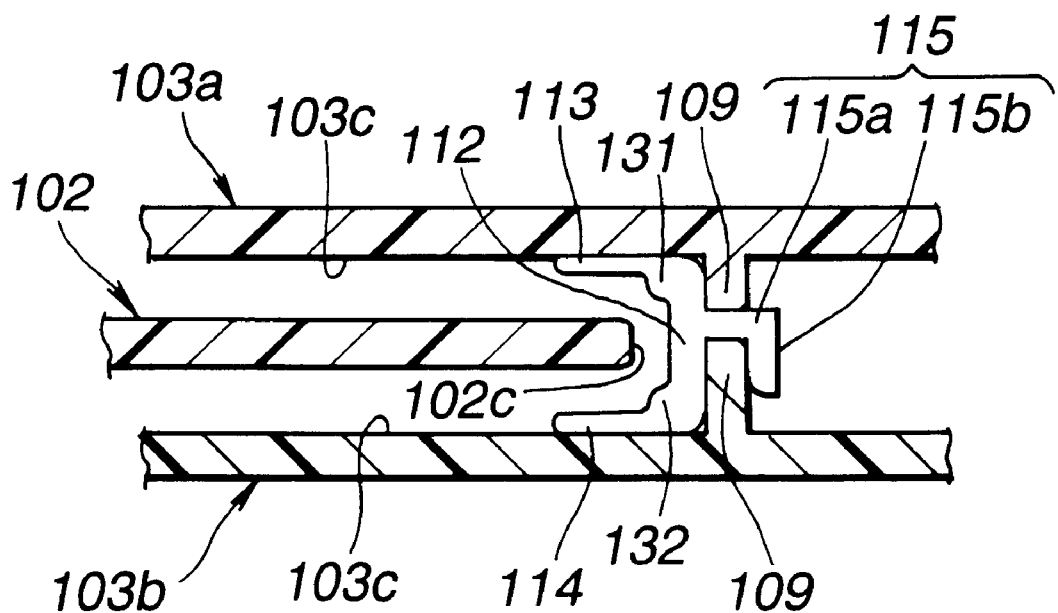
FIG. 30 is a cross-sectional view showing a further modified disc guide member of a disc cartridge according to the present invention.

FIG. 28 shows a disc cartridge of an eighth embodiment in which an upper protrusion 131 is formed at a corner where the disc end face supporting portion 112 intersects the upper disc major surface supporting portion 113 and a lower protrusion 132 is formed at a corner where the disc end face supporting portion 112 intersects the lower disc major surface supporting portion 114 so that the upper and lower ends of the disc end face supporting portion 112 are partially increased in thickness by these upper and lower protrusions 131, 132. In the non-use state of the disc cartridge 101, the outer peripheral end face 102c of the disc 102 is effectively supported by the lower thickened end portion of the disc end face supporting portion 112 provided with the protrusion 132. In the use state of the disc cartridge 101, the outer peripheral end face 102c of the disc 102 is positioned at a central thin-walled portion of the disc end face supporting portion 112, away from the position of the upper and lower protrusions 131, 132, as shown in FIG. 30, thus assuring an ample spacing between the outer peripheral end face 102c of the disc 102 and the disc end face supporting portion 112 which permits unhampered rotation of the optical disc 102.

Figure 31:
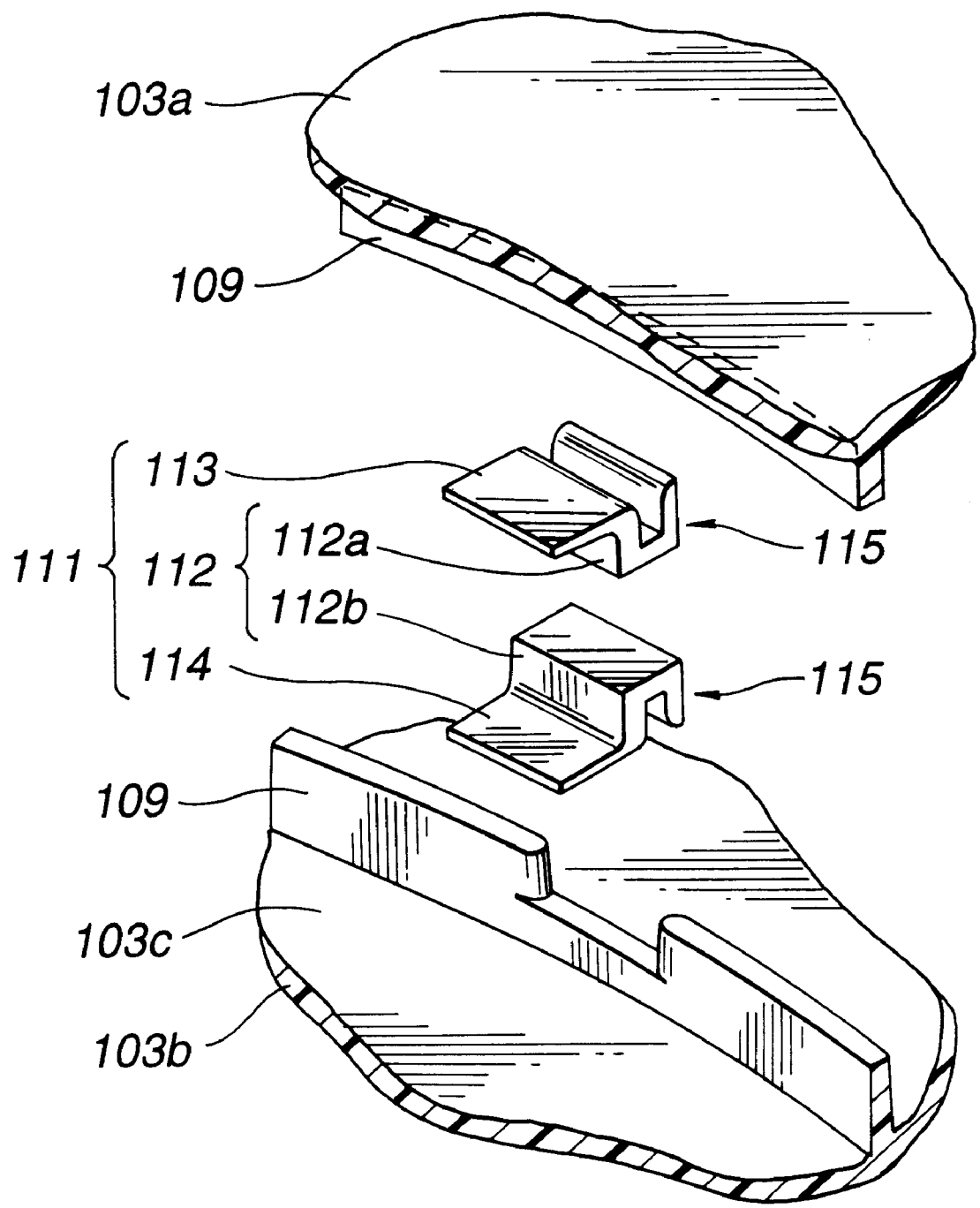
FIG. 31 is a schematic perspective view of a further modified disc cartridge according to the present invention.

In a disc cartridge according to a ninth embodiment, the upper and lower disc major surface supporting portions 113, 114 are connected to the upper and lower ends of the disc end surface supporting portion 112 for forming the disc supporting member 111 with a substantially U-shaped cross-section. It is however possible to divide the disc end face supporting portion 112 into upper and lower portions, as shown in FIG. 31. In this case, the upper disc major surface supporting portion 113 is connected to the upper disc end face supporting portion 112a, while the lower disc major surface supporting portion 114 is connected to the lower disc end face supporting portion 112b, with the upper and lower disc end face supporting portions 112a, 112b being mounted by hook portions 115 to the circular rib 109.

What is claimed is:

1. A disc cartridge comprising:
a disc-shaped recording medium having a signal recording area for recording information signals, an inner rim holding portion formed radially inwardly of said signal recording area and having a center aperture formed therein, and a non-recording area where no information signals are recorded, said non-recording area being formed radially outwardly of said signal recording area;
a main cartridge body portion having a disc housing wall section set upright on facing major surfaces for defining a disc housing section for rotatably accommodating said disc-shaped recording medium; and
a position controlling mechanism provided in said disc housing section for extending along said disc housing wall section for controlling the housing position of the disc-shaped recording medium accommodated therein, said position controlling mechanism including a plurality of disc guide members providing means for absorbing shock applied to the recording medium, each said disc guide member being formed of a stationary guide member and a boss member fit within an aperture of the stationary guide member, each said boss member having a collision surface for absorbing the shock on collision of the non-recording lateral edge of the recording medium against the stationary guide member and wherein each said disc guide member is positioned in a corresponding interrupted portion of said disc housing wall section such that upper and lower flange portions of each said stationary guide member support said non-recording area of said disc-shaped recording medium without an external force being applied to said disc-shaped recording medium to achieve such support.

2. The disc cartridge as claimed in claim 1 wherein said stationary guide member includes a guide portion set substantially upright on facing major surfaces of said main cartridge body portion, and
said upper flange portion and said lower flange portion are protuberantly formed on both ends and around the periphery of said guide portion in registration with said non-recording area.

3. The disc cartridge as claimed in claim 1 wherein position control mechanism is provided on a mounting portion constituted by an upstanding wall section formed in continuation to the disc housing wall section.

4. The disc cartridge as claimed in claim 2 wherein said guide portion, upper flange portion and the lower flange portion are formed of an elastic material.

5. A disc cartridge comprising a circular rib provided in each of an upper cartridge half and a lower cartridge half forming a main cartridge body portion, said circular ribs and the inner wall surfaces of the upper and lower cartridge halves define a disc housing section for rotatably housing a disc therein, said circular ribs having a disc supporting member mounting portion formed by recessing a portion of an upper surface thereof, a disc supporting member formed of an elastic material provided in said disc housing section for supporting a non-recording area of said disc; and wherein said disc supporting member has a disc end face supporting surface arranged along the inner peripheral surface of said circular rib for being protruded from said inner peripheral surface, an upper disc major surface supporting portion arranged along the inner wall surface of said upper cartridge half for being protruded from the inner wall surface, a lower disc major surface supporting portion arranged along the inner wall surface of said lower cartridge half for being protruded from the inner wall surface, and a hook portion connected to an outer peripheral surface said disc end face supporting surface which is engaged within said disc supporting member mounting portion such that the upper and lower disc manor surfaces extend outwardly from said circular ribs and thereby support the non-recording area of the disc therebetween, and wherein said disc supporting member is supported by being clamped between said upper cartridge half and the lower cartridge half.

6. The disc cartridge as claimed in claim 5 wherein the inner peripheral surface of the disc end face supporting surface is a circular surface smaller in diameter than the inner peripheral surface of the circular rib.

7. The disc cartridge as claimed in claim 5 wherein a protrusion is provided at a corner where the disc end face supporting surface intersects the upper and lower disc major supporting portion.

8. The disc cartridge as claimed in claim 5 wherein the angle of intersection between the disc end face supporting portion and the upper or lower disc major surface supporting portion is set so as to be larger than 90°.

* * * * *